United States Patent [19]
Eriksson et al.

[11] Patent Number: 6,122,367
[45] Date of Patent: Sep. 19, 2000

[54] SUBSCRIBER LINE INTERFACE CIRCUIT

[75] Inventors: Hans Eriksson, Järfälla; Elisabeth Larsson, Bromma, both of Sweden

[73] Assignee: Telefonaktiebolaget LM Ericsson, Stockholm, Sweden

[21] Appl. No.: 08/961,017

[22] Filed: Oct. 30, 1997

[30] Foreign Application Priority Data

Nov. 8, 1996 [SE] Sweden .................................. 9604103

[51] Int. Cl.$^7$ ...................................................... H04M 9/00
[52] U.S. Cl. ........................... 379/399; 379/377; 379/413
[58] Field of Search .................................... 379/399, 398, 379/413, 377, 381, 424, 322, 324, 382, 405; 324/98, 725, 706; 323/365; 320/165, 127

[56] References Cited

U.S. PATENT DOCUMENTS

| | | | |
|---|---|---|---|
| 4,451,703 | 5/1984 | Brightman et al. ..................... | 379/385 |
| 4,598,173 | 7/1986 | Chea, Jr. et al. ....................... | 379/399 |
| 4,631,359 | 12/1986 | Johansson et al. ..................... | 379/413 |
| 4,800,589 | 1/1989 | Siligoni et al. ......................... | 379/413 |
| 5,249,226 | 9/1993 | Schopfer ................................. | 379/412 |
| 5,323,461 | 6/1994 | Rosebaum et al. ..................... | 379/413 |
| 5,526,425 | 6/1996 | Meyer et al. ........................... | 379/413 |
| 5,568,547 | 10/1996 | Nishimura ............................... | 379/413 |
| 5,619,567 | 4/1997 | Apfel ....................................... | 379/413 |
| 5,659,610 | 8/1997 | Schorr et al. ........................... | 379/413 |
| 5,721,774 | 2/1998 | Stiefel ..................................... | 379/413 |
| 5,734,714 | 3/1998 | Nishimura ............................... | 379/413 |
| 5,854,550 | 12/1998 | Knollman ................................ | 320/127 |
| 5,854,839 | 12/1998 | Chen et al. ............................. | 379/413 |

FOREIGN PATENT DOCUMENTS 62-155665   7/1997   Japan .

OTHER PUBLICATIONS

Pieters, Jozef et al., "A Monolithic 70–V Subscriber Line Interface Circuit", IEEE Journal of Solid–State Circuits, vol. SC–21, No. 2, pp. 252–258, Apr. 1986.

Forsberg, Per., "En krets i ropet", Modern Elektronik, No. 13, pp. 46–50, 1984.

*Primary Examiner*—Forester W. Isen
*Assistant Examiner*—Jacques M. Saint-Surin
*Attorney, Agent, or Firm*—Burns, Doane, Swecker & Mathis, L.L.P.

[57] ABSTRACT

In a subscriber line interface circuit, a device applies to a line, associated with the line interface circuit, a substantially constant line current of a first predetermined value for line voltages up to a first voltage having an absolute value which, by a predetermined amount, is lower than the supply voltage of the line interface circuit. For line voltages between the first voltage and a second voltage having an absolute value which, by a predetermined amount, is higher than the first voltage, a line current which is inversely proportional to the line voltage and of a value between said first predetermined value and a second predetermined, lower value is applied to the line. For line voltages between the second voltage and a third voltage having an absolute value which, by a predetermined amount, is higher than the second voltage, a substantially constant line current of the second predetermined value is applied to the line. For line currents of lower value than said second predetermined value, the line voltage is maintained substantially constant at the third voltage.

3 Claims, 2 Drawing Sheets

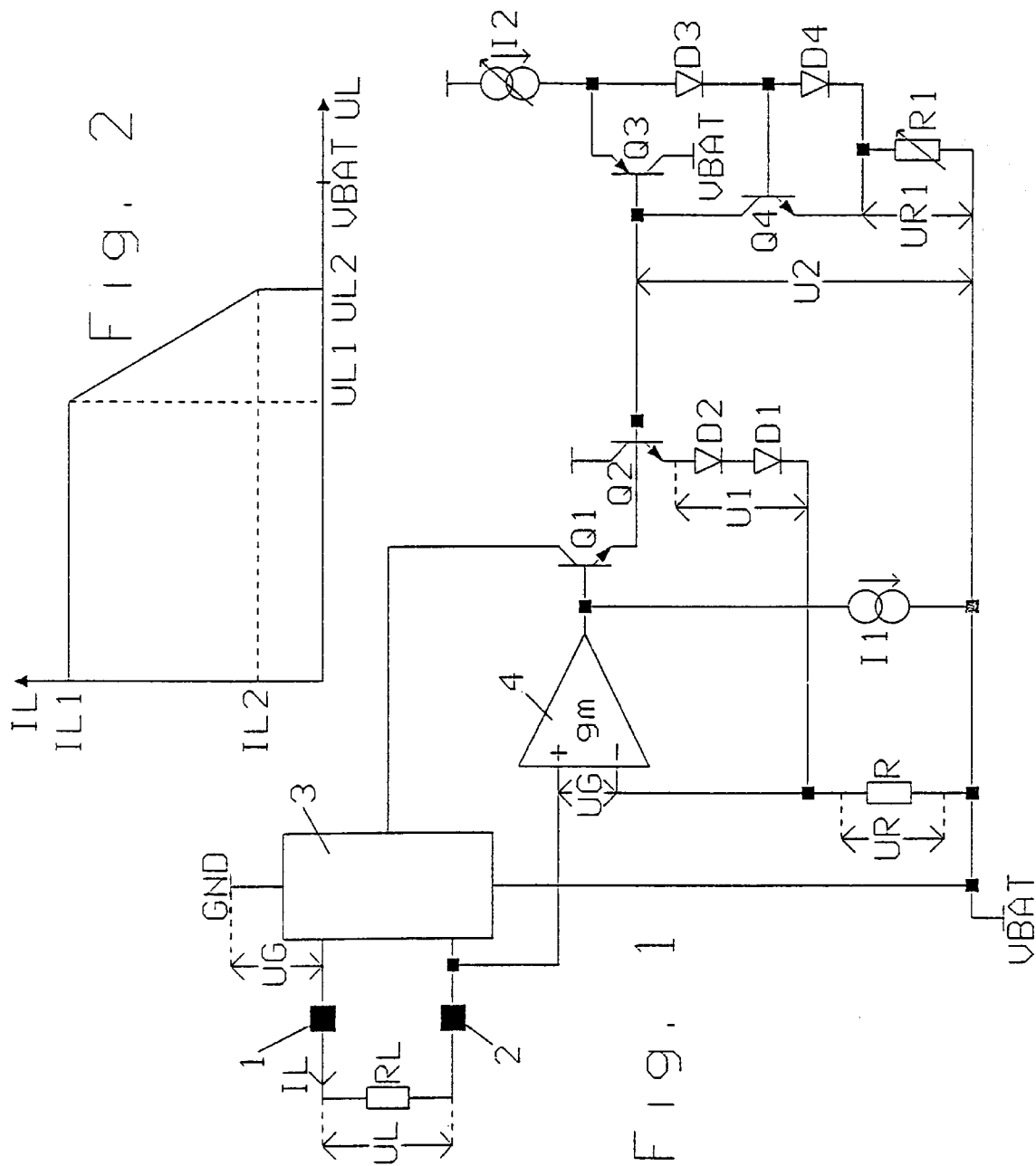

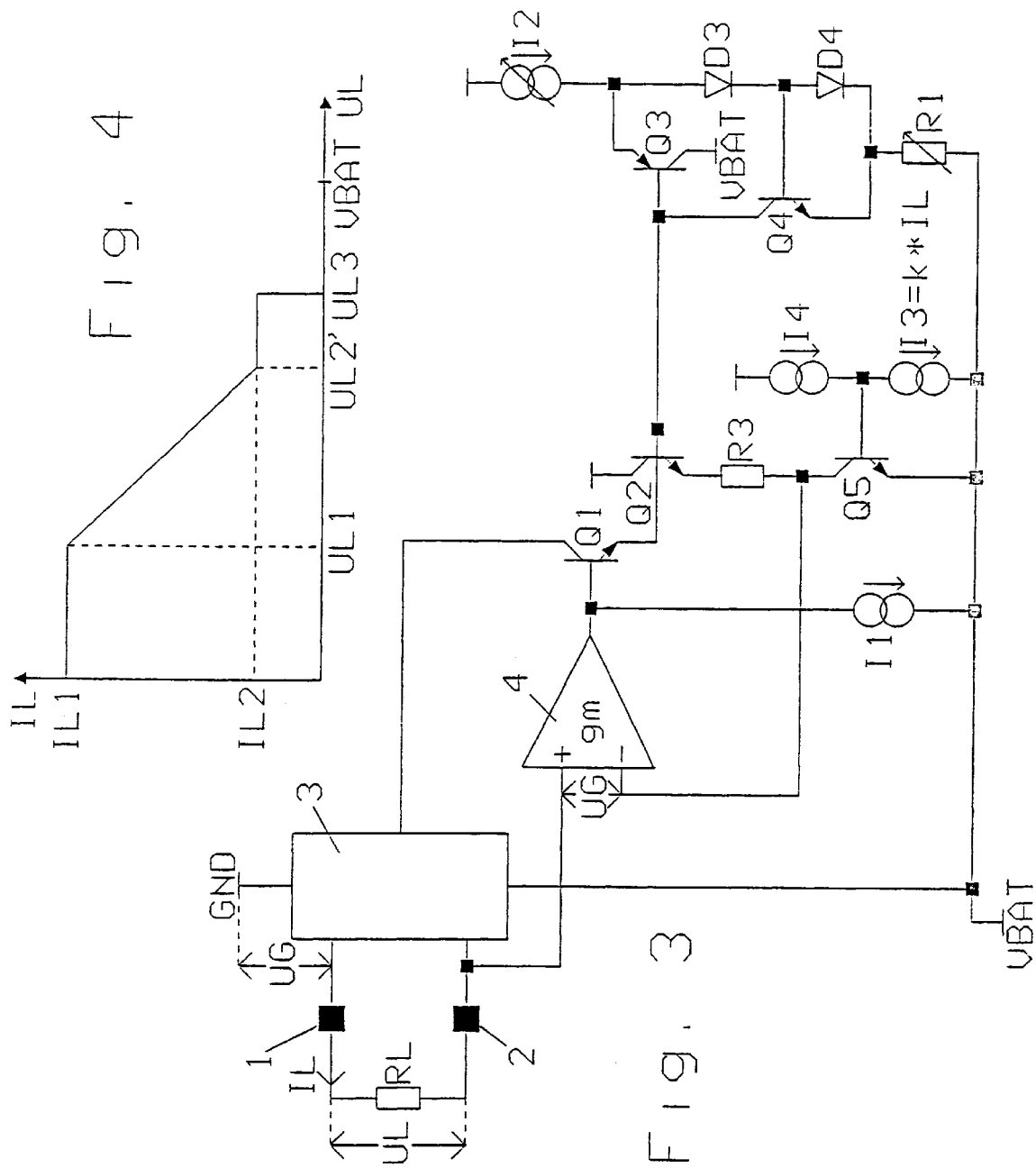

6,122,367

SUBSCRIBER LINE INTERFACE CIRCUIT

TECHNICAL FIELD

The invention relates to a subscriber line interface circuit.

BACKGROUND

Today's subscriber line interface circuits should imitate the traditional way of feeding a telephone line from an exchange battery via a feeding resistance. Thus, this feeding resistance determines the dependence of the line current on the line voltage, i.e. the line feed characteristic of the line interface circuit.

However, different countries require different feeding resistances, which results in that today's line interface circuits are not generally usable but have to be adapted to the requirements specified in the respective county For a short-circuited line and for low-resistance line loads, the line current will be high which causes a high power dissipation in the feeding resistance. To avoid this, it is known to limit the maximum value of the line current. Also, this maximum value differs from country to country and, consequently, today's line interface circuits have to be adapted also in this respect to the requirements specified in the respective country. However, in today's line interface circuits, it is not possible to arbitrarily limit the line current to desired values in a simple way.

When the line is open, i.e. with the handset on-hook, today's line interface circuits have the disadvantage that the line voltage can be lower than the expected, ideal line voltage for a given feeding voltage. This can depend e.g. on the fact that the associated line may have a leakage resistance or that the device, e.g. a telephone set, connected to the line draws current from the line for some reason. The value of this open-line voltage is, however, very important for some units, e.g. so-called MTUs (Maintenance and Test Units) and certain facsimile apparatuses.

Moreover, today's line interface circuits are not adapted to adapt their line feed characteristic to possible feeding voltage or supply voltage variations.

SUMMARY

The object of the invention is to eliminate the above disadvantages of subscriber line interface circuits known so far.

This is attained by means of the subscriber line interface circuit according to the invention mainly in that it comprises means adapted to apply to a line, associated with the line interface circuit, an essentially constant line current of a first predetermined value for line voltages up to a first voltage having an absolute value which, by a predetermined amount, is lower than the supply voltage of the line interface circuit, means adapted to apply to the line, a line current which is inversely proportional to the line voltage and of a value between said first predetermined value and a second predetermined, lower value for line voltages between the first voltage and a second voltage having an absolute value which, by a predetermined amount, is higher than the first voltage, means adapted to apply to the line, an essentially constant line current of the second predetermined value for line voltages between the second voltage and a third voltage having an absolute value which, by a predetermined amount, is higher than the second voltage, and means adapted to maintain the line voltage essentially constant at the third voltage for line currents of lower value than said second predetermined value.

Alternatively, the line interface circuit according to the invention comprises means adapted to apply to a line, associated with the line interface circuit, an essentially constant line current of a first predetermined value for line voltages up to a first voltage having an absolute value which, by a predetermined amount, is lower than the supply voltage of the line interface circuit, means adapted to apply to the line, a line current which is inversely proportional to the line voltage and of a value between said first predetermined value and a second predetermined, lower value for line voltages between the first voltage and a second voltage having an absolute value which, by a predetermined amount, is higher than the first voltage, and means adapted to maintain the line voltage essentially constant at the second voltage for line currents of lower value than said second predetermined value.

Hereby, the subscriber line interface circuit according to the invention will be insensitive to supply voltage variations as well as to leakage currents on the line, and will also be easily adaptable to requirements in different countries.

BRIEF DESCRIPTION OF THE DRAWING

The invention will be described more in detail below with reference to the appended drawing, on which FIG. 1 schematically shows a first embodiment of a subscriber line interface circuit according to the invention, FIG. 2 shows the line feed characteristic for the line interface circuit in FIG. 1, FIG. 3 schematically shows a second embodiment of the line interface circuit according to the invention, and FIG. 4 shows the line feed characteristic for the line interface circuit in FIG. 3.

DETAILED DESCRIPTION

FIG 1. schematically shows a first embodiment of a subscriber line interface circuit according to the invention. In a manner known per se, the line interface circuit is connected to the A-wire 1 and B-wire 2 of a telephone line via a respective output amplifier (not shown) in a driving stage 3. The driving stage 3 is connected between ground and a supply voltage VBAT which normally is supplied by a battery (not shown).

As shown in FIG. 1, the telephone line is terminated by means of a resistor RL which represents the sum of the resistance of the line and the resistance of a device connected to the line, e.g. a telephone set (not shown).

The control input terminal of the driving stage 3 is connected to the collector of a transistor Q1. The base of the transistor Q1 is connected, on the one hand, to the output to of a transconductance amplifier 4 having a transconductance gm and, on the other hand, to the supply voltage VBAT via a current generator I1. The "+"—input terminal of the transconductance amplifier 4 (the upper input terminal in FIG. 1) is connected to the B-wire 2, while its "−"—input terminal (the lower input terminal in FIG. 1) is connected, on the one hand, to the supply voltage VBAT via a resistor R and, on the other hand, to the emitter of a transistor Q2 via two series-connected diodes D1, D2. The voltage across the resistor R is denoted UR, while the voltage across the diodes D1, D2 is denoted U1.

The base of the transistor Q2 is connected to the interconnection point between the emitter of the transistor Q1, the base of a transistor Q3 and the collector of a transistor Q4, while the collector of the transistor Q2 is connected to ground. The voltage between this interconnection point and the supply voltage VBAT is denoted U2.

The collector of the transistor Q3 is connected to the supply voltage VBAT, while its emitter is connected, on the one hand, to ground via a programmable current generator I2 and, on the other hand, to the anode of a diode D3 whose cathode is connected, on the one hand, to the anode of a diode D4 and, on the other hand, to the base of the transistor Q4.

The emitter of the transistor Q4 is interconnected with the cathode of the diode D4 and the interconnection point is connected to the supply voltage VBAT via a settable resistor R1.

the transistor Q4 and the diodes D3 and D4 together form a current mirror to mirror the current flowing through the diodes D3, D4 to the collector of the transistor Q4. The sum of the current through the diodes D3, D4 and the collector current of the transistor Q4 will flow through the resistor R1. The voltage appearing across the resistor R1 is denoted UR1.

In a manner not shown, but known per se, the voltage between the A-wire 1 and ground is maintained equal to the voltage between the B-wire 2 and the "−"—input terminal of the transconductance amplifier 4. These two equal voltages, usually called "guardband", are denoted UG. The guardbands are there to enable speech signals and voice frequency signalling on the line also when the handset is on-hook, and are determined in the embodiment shown by the current of the current generator I1 and the transconductance gm of the transconductance amplifier 4 in such a manner that UG =I1/gm.

In accordance with the invention, the line interface circuit shown in FIG. 1 is adapted to bring about the line feed characteristic shown in FIG. 2 when the line load RL varies from a short-circuited to an open line. As apparent from FIG. 2, the line interface circuit applies an essentially constant line current IL of a predetermined value IL1 to the associated line for line voltages UL up to a voltage UL1. The absolute value of the voltage UL1 is lower than the supply voltage VBAT of the line interface circuit by a predetermined amount. For line voltages between the voltage UL1 and a voltage UL2 having an absolute value which is higher than the voltage UL1 by a predetermined amount, the line interface circuit according to FIG. 1 applies a line current IL inversely proportional to the line voltage UL and of a value between IL1 and a predetermined, lower value IL2 to the line. For line currents IL lower than IL2, the line interface circuit maintains the line voltage UL substantially constant at the voltage UL2.

To accomplish this, the programmable current generator I2 is programmed to apply a line current IL of the desired, substantially constant value IL1 according to FIG. 2 to the line 1, 2. The current from the current generator I2 is mirrored to the collector of the transistor Q4 and applied to the control input terminal of the driving circuit 3 via the transistor Q1. On the basis of the current appearing on the control input terminal, the driving circuit 3 applies a corresponding line current of the value IL1 to the line 1, 2. Under these conditions, the transistor Q3 is cut off.

Thus, the line voltage UL will be equal to IL1×RL. Load resistances RL of different values will, therefore, give line voltages UL of different values as long as IL=IL1.

Usually, the line current IL1 is so chosen that it corresponds to the current at which the telephone set in the application in question practically ceases to compensate for line length depending attenuation on the line.

According to the invention, IL=IL1 for line voltages between 0V, i.e. short-circuited line, and the line voltage UL1. This line voltage has been set so that |UL1|=|VBAT−2UG+U1−UR1|, i.e. the absolute value of the line voltage UL1 is lower than the supply voltage VBAT by a predetermined amount. UG and U1 are constant and preset, and UR1 is constant when |UL|<|UL1|.

When the line voltage UL becomes higher than UL1 due to the fact that the line load RL has increased, e.g. in that a device having a bigger resistance has been connected to the line or that a longer line has been connected to the line interface circuit, the transistor Q3 starts to conduct, Hereby, the current through the diodes D3 and D4 will be lower and, thereby, also the current through the resistor R1 which causes the voltage UL1 to become lower. When |UL|>|UL1|, UR1=UR+U1, the voltage U1 being constant and the voltage UR being inversely proportional to the line voltage UL. Also, the collector current of the transistor Q4 and the current through the transistor Q1 will be lower. Thus, the control current to the driving stage 3 will be lower which in its turn causes the line current IL to be lower than IL1. The line current IL will, thus, be inversely proportional to the line voltage UL.

If the current through R1 becomes still lower, finally UR=0 when UR1=U1.

Then, the feedback loop to the transconductance amplifier 4, comprising the transistor Q2 and the diodes D1, D2, will be broken which causes the amplification of the transconductance amplifier 4 to suddenly become tremendously high. Therefore, a small change of the line voltage UL will result in a very big change of the voltage UR1. Since the voltage UR1 determines the line current IL, a big line current change is obtained for a small line voltage change. The value of the line current IL2 when UR1=U1, is determined by the voltage U1 across the diodes D1, D2 and by the resistance of the resistor R1. If the resistance of the resistor R1 has been chosen in response to a requirement for a certain inclination of the line feed characteristic, the current IL2 can, thus, be set by a suitable choice of the voltage U1. The value of the current IL2 is chosen in view of the leakage current that can be expected in dependence on the value of the line leakage resistance.

Hereby, |UL2|=|VBAT−2UG|. Thus, the absolute value of this open-line voltage is lower than the supply voltage VBAT by a predetermined amount but higher than the line voltage value UL1 by a predetermined amount.

As mentioned in the introductory portion, for their operation, certain devices are dependent on a certain minimum line voltage when the handset is on-hook, i.e. a certain open-line voltage. By choosing this open-line voltage, |UL2|=|VBAT−2UG|, in accordance with the invention, this voltage is maintained constant also if current is drawn from the line by a leakage resistance or by a device which draws current when the handset is on-hook. To keep the power losses low in the line interface circuits and at the same tine keep the costs low for the exchange batteries, it is of course desirable that the open-line voltage is reached at a battery voltage which is as low as possible.

The appearance of the line feed characteristic between the points IL1/UL1 and IL2/IL2 in FIG. 2, i.e. its inclination, has to fulfill the requirements specified by the respective country as also mentioned in the introductory portion. According to the invention, the inclination of the line feed characteristic is changed simply by changing the resistance of the resistor R1. Hereby, it will be very easy to adapt the line interface circuit according to the invention to the requirements specified by the respective country.

FIG. 3 shows a second embodiment of the subscriber line interface circuit according to the invention, which to a great extent corresponds to the embodiment according to FIG. 1. Elements in FIG. 3 which are identical with elements in FIG. 1 have been provided with identical reference characters and will not be described in any greater detail in connection with FIG. 3.

According to the invention, the line interface circuit according to FIG. 3 is adapted to generate the line feed characteristic shown in FIG. 4, which differs from the characteristic shown in FIG. 2 merely in that line current is maintained essentially constant at the value IL2 for line voltages between a voltage UL2' and a voltage UL3.

Thus, the line interface circuit in FIG. 3 is adapted to apply an essentially constant line current IL of the value IL1 to the associated line for line voltages UL up to the voltage UL1 which in the same manner as in FIG. 2 is of an absolute value which is lower than the supply voltage VBAT of the line interface circuit by a predetermined amount. For line voltages between the voltage UL1 and the voltage UL2' which is of an absolute value which is higher than the voltage UL1 by a predetermined amount, the line interface circuit according to FIG. 1 applies, in the same manner as the line interface circuit according to FIG. 1, a line current IL which is inversely proportional to the line voltage UL and of a value between IL1 and IL2 to the line. In contrast to the line interface circuit according to FIG, 1, the line interface circuit according to FIG. 3 is adapted to apply a substantially constant line current IL of the value IL2 to the line for line voltages UL between the voltage UL2' and the voltage UL3 which is of an absolute value which is higher than the voltage UL2' by a predetermined amount. Then, the line interface circuit according to FIG. 3 is adapted to maintain the line voltage UL substantially constant at the voltage UL3 for line currents of lower value than IL2.

In the embodiment according to FIG. 3, the diodes D1 and D2, and the resistor R have been left out. Instead, a resistor R3 is connected between the emitter of the transistor Q2 and the collector of the transistor Q5 and the interconnection point between the resistor R3 and the collector of the transistor Q5 is connected to the "−"—input terminal of the transconductance amplifier 4. The emitter of the transistor Q5 is connected to the supply voltage VBAT. A current generator I3 is connected between the supply voltage VBAT and the base of the transistor Q5, while a current generator I4 is connected between ground and the base of the transistor Q5. As to the rest, the circuit shown in FIG. 3 corresponds to the circuit shown in FIG. 1.

The current generator I3 is adapted to output a current proportional to the line current IL, i.e. I3=k×IL, while the current generator I4 is adapted to output a selectable, constant current I4.

The current I4 is selected in such a manner that I3=I4 when IL=IL2 in accordance with FIG. 4. Hereby, the current IL2 will be independent of the value chosen for the resistor R1.

The transistor Q5 is cut off for line currents IL>IL2, i.e. for I3>I4, and, thus, does not have any function under these conditions.

However, the transistor Q5 starts to conduct for line currents IL<IL2. The transistor Q5 becomes saturated when the line voltage UL3 is reached. Also, |UL3|=|VBAT−2UG|.

Thereby, the feedback is interrupted to the "−"—input of the transconductance amplifier 4. This increases the amplification in the transconductance amplifier 4 substantially. Even at a small variation of the line voltage UL, a large variation of the line current IL is obtained.

As indicated in the introductory portion above, a problem with today's line interface circuits is that they are not adapted to adapt their line feed characteristics to possible supply voltage variations.

As should be apparent from the above, this problem is solved, in accordance with the invention, by typing the voltages UL1, UL2 and UL2', respectively, and UL3 to the supply voltage VBAT. Hereby, upon variations in the supply voltage VBAT, the voltages UL1, UL2 and UL2', respectively, and UL3 will be displaced along the UL axis in FIGS. 2 and 4, respectively, while maintaining the mutual "distances" to the supply voltage VBAT.

We claim:

1. A subscriber line interface circuit, comprising
means adapted to apply to a line, associated with the line interface circuit, a substantially constant line current of a first predetermined value for line voltages up to a first voltage having an absolute value which, by a predetermined amount, is lower than a supply voltage of the line interface circuit,
means adapted to apply to the line, a line current which is inversely proportional to the line voltage and of a value between said first predetermined value and a second predetermined, lower value for line voltages between the first voltage and a second voltage having an absolute value which, by a predetermined amount, is higher than the first voltage,
means adapted to apply to the line, a substantially constant line current of the second predetermined value for line voltages between the second voltage and a third voltage having an absolute value which, by a predetermined amount, is higher than the second voltage, and
means adapted to maintain the line voltage substantially constant at the third voltage for line currents of lower value than said second predetermined value.

2. The line interface circuit as claimed in claim 1, further comprising means adapted to set the first predetermined value of the line current to a desired value.

3. The line interface circuit as claimed in claim 1, further comprising means adapted to set a constant of proportionality between the line voltage and the line current to a desired value.

* * * * *